United States Patent [19]
Holbrook et al.

[11] Patent Number: 4,975,844
[45] Date of Patent: Dec. 4, 1990

[54] METHOD OF DETERMINING THE THROTTLE ANGLE POSITION FOR AN ELECTRONIC AUTOMATIC TRANSMISSION SYSTEM

[75] Inventors: Gerald L. Holbrook, Rochester Hills; Michael R. Lindsay, Livonia; Hemang S. Mehta, Sterling Heights, all of Mich.

[73] Assignee: Chrysler Corporation, Highland Park, Mich.

[21] Appl. No.: 189,579

[22] Filed: Apr. 29, 1988

[51] Int. Cl.$^5$ .................. G05D 17/02; F02D 41/16; F02D 41/24
[52] U.S. Cl. .................. 364/424.1; 123/361; 74/866
[58] Field of Search .............. 123/339, 361, 399, 480, 123/486; 364/424.1, 431.11

[56] References Cited

U.S. PATENT DOCUMENTS

| | | | |
|---|---|---|---|
| 3,876,028 | 4/1975 | Asano et al. | 74/866 |
| 3,881,368 | 5/1975 | Furuhashi et al. | 74/866 |
| 3,942,393 | 3/1976 | Forster et al. | 74/866 |
| 3,956,947 | 5/1976 | Leising et al. | 74/866 |
| 4,044,634 | 8/1977 | Florus et al. | 74/866 |
| 4,073,204 | 2/1978 | Dick | 74/866 |
| 4,082,013 | 4/1978 | Dornfeld et al. | 74/866 |
| 4,131,036 | 12/1978 | Ivey et al. | 74/866 |
| 4,174,645 | 11/1979 | Ohmae et al. | 74/866 |
| 4,208,925 | 6/1980 | Miller et al. | 74/866 |
| 4,220,058 | 9/1980 | Petzold | 74/866 |
| 4,224,842 | 9/1980 | Rabus et al. | 74/866 |
| 4,244,244 | 1/1981 | Rembold et al. | 74/866 |
| 4,258,591 | 3/1981 | Eckert et al. | 74/866 |
| 4,259,882 | 4/1981 | Miller | 74/866 |
| 4,283,970 | 8/1981 | Vukovich | 74/866 |
| 4,380,048 | 4/1983 | Kishi et al. | 364/424.1 |
| 4,468,988 | 9/1984 | Hiramatsu | 74/868 |
| 4,468,989 | 9/1984 | Rosen | 74/869 |
| 4,485,443 | 11/1984 | Knodler et al. | 364/424.1 |
| 4,503,734 | 3/1985 | Acker | 74/866 |
| 4,506,642 | 3/1985 | Pfaligraf et al. | 123/361 |
| 4,519,360 | 5/1985 | Murakami | 123/399 |
| 4,527,678 | 7/1985 | Pierce et al. | 74/866 |
| 4,535,412 | 8/1985 | Cederquist | 364/424.1 |
| 4,584,906 | 4/1986 | Nagaoka et al. | 74/866 |
| 4,599,695 | 7/1986 | Deutsch | 364/431.11 |
| 4,631,628 | 12/1986 | Kissel | 123/490 |
| 4,637,361 | 1/1987 | Killen et al. | 123/339 |
| 4,667,540 | 5/1987 | Yagi | 74/866 |
| 4,680,988 | 7/1987 | Mori | 74/866 |
| 4,693,142 | 9/1987 | Kurihara et al. | 74/866 |
| 4,707,789 | 11/1987 | Downs et al. | 364/424.1 |
| 4,779,597 | 10/1988 | Takaku et al. | 364/431.11 |

OTHER PUBLICATIONS

Takeo Hiramatsu et al., "Control Technology of Minimal Slip—Type Torque Converter Clutch", SAE Technical Paper 850460 (1985).

M. Suga et al., "The Control of the Lockup Clutch Used in the Microprocessor Controlled Automatic Transmission", 1 Mech. E. (1985).

*Primary Examiner*—Felix D. Gruber
*Attorney, Agent, or Firm*—Mark P. Calcaterra

[57] ABSTRACT

A method of determining the throttle angle position for an electronic automatic transmission system wherein a controller is programmed to determine the throttle angle position of the throttle in the engine and to detect any failures of the hardware used to determine throttle angle position and upon detecting a failure, providing a default throttle angle value to guarantee satisfactory operation.

9 Claims, 3 Drawing Sheets

METHOD OF DETERMINING THE THROTTLE ANGLE POSITION FOR AN ELECTRONIC AUTOMATIC TRANSMISSION SYSTEM

BACKGROUND OF THE INVENTION

1. Field of the Invention

The present invention relates to an automatic transmission primarily intended for motor vehicle use, and more particularly, to a method of determining the throttle angle position for a transmission that is controlled electronically and hydraulically.

2. Description of Related Art

Generally speaking, land vehicles require three basic components. These components comprise a power plant (such as an internal combustion engine) a power train and wheels. The internal combustion engine produces force by the conversion of the chemical energy in a liquid fuel into the mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels, so that the vehicle may be driven both forward and backward.

A conventional transmission includes a hydrodynamic torque converter to transfer engine torque from the engine crankshaft to a rotatable input member of the transmission through fluid-flow forces. The transmission also includes frictional units which couple the rotating input member to one or more members of a planetary gearset. Other frictional units, typically referred to as brakes, hold members of the planetary gearset stationary during flow of power. These frictional units are usually brake clutch assemblies or band brakes. The drive clutch assemblies can couple the rotating input member of the transmission to the desired elements of the planetary gearsets, while the brakes hold elements of these gearsets stationary. Such transmission systems also typically provide for one or more planetary gearsets in order to provide various ratios of torque and to ensure that the available torque and the respective tractive power demand are matched to each other.

Transmissions are generally referred to as manually actuated or automatic transmissions. Manual transmissions generally include mechanical mechanisms for coupling rotating gears to produce different ratio outputs to the drive wheels.

Automatic transmissions are designed to take automatic control of the frictional units, gear ratio selection and gear shifting. A thorough description of general automatic transmission design principals may be found in "Fundamentals of Automatic Transmissions and Transaxles," Chrysler Corporation Training Manual No. TM-508A. Additional descriptions of automatic transmissions may be found in U.S. Pat. No. 3,631,744, entitled "Hydromatic Transmission," issued Jan. 4, 1972 to Blomquist, et al., and U.S. Pat. No. 4,289,048, entitled "Lock-up System for Torque Converter," issued on Sept. 15, 1981 to Mikel, et al. Each of these patents is hereby incorporated by reference.

In general, the major components featured in such an automatic transmission are: a torque converter as above-mentioned; fluid pressure-operated multi-plate drive or brake clutches and/or brake bands which are connected to the individual elements of the planetary gearsets in order to perform gear shifts without interrupting the tractive power; one-way clutches in conjunction with the frictional units for optimization of power shifts; and transmission controls such as valves for applying and releasing elements to shift the gears (instant of shifting), for enabling power shifting, and for choosing the proper gear (shift point control), dependent on shift-program selection by the driver (selector lever), accelerator position, the engine condition and vehicle speed.

The control system of the automatic transmission is typically hydraulically operated through the use of several valves to direct and regulate the supply of pressure. This hydraulic pressure control will cause either the actuation or deactuation of the respective frictional units for effecting gear changes in the transmission. The valves used in the hydraulic control circuit typically comprise spring-biased spool valves, spring-biased accumulators and ball check valves. Since many of these valves rely upon springs to provide a predetermined amount of force, it will be appreciated that each transmission design represents a finely tuned arrangement of interdependent valve components. While this type of transmission control system has worked well over the years, it does have its limitations. For example, such hydraulically controlled transmissions are generally limited to one or a very small number of engines and vehicle designs. Therefore, considerable cost is incurred by an automobile manufacturer to design, test, build, inventory and repair several different transmission units in order to provide an acceptable broad model line for consumers.

Additionally, it should be appreciated that such hydraulically controlled transmission systems cannot readily adjust themselves in the field to compensate for varying conditions such as normal wear on the components, temperature swings and changes in engine performance over time. While each transmission is designed to operate most efficiently within certain specific tolerances, typical hydraulic control systems are incapable of taking self-corrective action on their own to maintain operation of the transmission at peak efficiency.

However, in recent years, a more advanced form of transmission control system has been proposed, which would offer the possibility of enabling the transmission to adapt itself to changing conditions. In this regard, U.S. Pat. No. 3,956,947, issued on May 18, 1976 to Leising, et al., which is hereby incorporated by reference, sets forth a fundamental development in this field. Specifically, this patent discloses an automatic transmission design which features an "adaptive" control system that includes electrically operated solenoid-actuated valves for controlling certain fluid pressures. In accordance with this electric/hydraulic control system, the automatic transmission would be "responsive" to an acceleration factor for controlling the output torque of the transmission during a shift from one ratio of rotation (between the input and output shafts of the transmission) to another. Specifically, the operation of the solenoid-actuated valves would cause a rotational speed versus time curve of a sensed rotational component of the transmission to substantially follow along a predetermined path during shifting.

3. Objects of the Present Invention

It is one of the principal objects of the present invention to provide a significantly advanced electronically controlled transmission which is fully adaptive. By fully adaptive, it is meant that substantially all shifts are made using closed-loop control (i.e., control based on feedback). In particular, the control is closed loop on speed, speed ratio, or slip speed of either $N_t$ (turbine of the torque converter) and $N_e$ (engine) or a combination of $N_t$ and $N_o$ (output) which will provide the speed ratio or slip speed. This transmission control is also capable of "learning" from past experience and making appropriate adjustments on that basis.

Another object of the present invention is to provide an automatic transmission in which the shift quality is maintained approximately uniform regardless of the engine size, within engine performance variations or component condition (i.e. the transmission control system will adapt to changes in engine performance or in the condition of the various frictional units of the transmission).

It is a more specific object of the present invention to provide a method of determining the throttle angle position for use in an automatic transmission and to detect any failures of the associated hardware used in determining the throttle angle position.

This application is one of several applications filed on the same date, all commonly assigned and having similar Specification and Drawings, these applications being identified below.

| U.S. Ser. No. | U.S. Pat. No. | Title |
|---|---|---|
| 187,772 | 4,875,391 | AN ELECTRONICALLY-CONTROLLED, ADAPTIVE AUTOMATIC TRANSMISSION SYSTEM |
| 187,757 | | AUTOMATIC FOUR-SPEED TRANSMISSION |
| 189,493 | 4,915,204 | PUSH/PULL CLUTCH APPLY PISTON OF AN AUTOMATIC TRANSMISSION |
| 187,781 | | SHARED REACTION PLATES BETWEEN CLUTCH ASSEMBLIES IN AN AUTOMATIC TRANSMISSION |
| 189,492 | | CLUTCH REACTION AND PRESSURE PLATES IN AN AUTOMATIC TRANSMISSION |
| 188,602 | | BLEEDER BALL CHECK VALVES IN AN AUTOMATIC TRANSMISSION |
| 188,610 | | PRESSURE BALANCED PISTONS IN AN AUTOMATIC TRANSMISSION |
| 189,494 | | DOUBLE-ACTING SPRING IN AN AUTOMATIC TRANSMISSION |
| 188,613 | 4,907,681 | PARK LOCKING MECHANISM FOR AN AUTOMATIC TRANSMISSION |
| 187,770 | 4,887,491 | SOLENOID-ACTUATED VALVE ARRANGEMENT OF AN AUTOMATIC TRANSMISSION SYSTEM |
| 187,796 | | RECIPROCATING VALVES IN A FLUID SYSTEM OF AN AUTOMATIC TRANSMISSION |
| 187,705 | 4,887,512 | VENT RESERVOIR IN A FLUID SYSTEM OF AN AUTOMATIC TRANSMISSION |
| 188,592 | | FLUID ACTUATED SWITCH VALVE IN AN AUTOMATIC TRANSMISSION |
| 188,598 | 4,893,652 | DIRECT-ACTING, NON-CLOSE CLEARANCE SOLENOID-ACTUATED VALVES |
| 188,618 | | NOISE CONTROL DEVICE FOR A SOLENOID-ACTUATED VALVE |
| 188,605 | 4,871,887 | FLUID ACTUATED PRESSURE SWITCH FOR AN AUTOMATIC TRANSMISSION |
| 187,210 | | METHOD OF APPLYING REVERSE GEAR OF AN AUTOMATIC TRANSMISSION |
| 187,672 | | TORQUE CONVERTER CONTROL VALVE IN A FLUID SYSTEM OF AN AUTOMATIC TRANSMISSION |
| 187,120 | | CAM-CONTROLLED MANUAL VALVE IN AN AUTOMATIC TRANSMISSION |
| 187,181 | 4,907,475 | FLUID SWITCHING MANUALLY BETWEEN VALVES IN AN AUTOMATIC TRANSMISSION |
| 187,704 | | METHOD OF OPERATING AN ELECTRONIC AUTOMATIC TRANSMISSION SYSTEM |
| 188,020 | | METHOD OF SHIFT SELECTION IN AN ELECTRONIC AUTOMATIC TRANSMISSION SYSTEM |
| 187,991 | | METHOD OF UNIVERSALLY ORGANIZING SHIFTS FOR AN ELECTRONIC AUTOMATIC TRANSMISSION SYSTEM |
| 188,603 | | METHOD OF DETERMINING AND CONTROLLING THE LOCK-UP OF A TORQUE CONVERTER IN AN ELECTRONIC AUTOMATIC TRANSMISSION SYSTEM |
| 188,617 | | METHOD OF ADAPTIVELY IDLING AN ELECTRONIC AUTOMATIC TRANSMISSION SYSTEM |
| 189,553 | | METHOD OF DETERMINING THE DRIVER SELECTED OPERATING MODE OF AN AUTOMATIC TRANSMISSION SYSTEM |
| 188,615 | | METHOD OF DETERMINING THE SHIFT LEVER POSITION OF AN ELECTRONIC AUTOMATIC TRANSMISSION SYSTEM |

-continued

| U.S. Ser. No. | U.S. Pat. No. | Title |
|---|---|---|
| 188,594 | | METHOD OF DETERMINING THE ACCELERATION OF A TURBINE IN AN AUTOMATIC TRANSMISSION |
| 187,771 | | METHOD OF DETERMINING THE FLUID TEMPERATURE OF AN ELECTRONIC AUTOMATIC TRANSMISSION SYSTEM |
| 188,607 | | METHOD OF DETERMINING THE CONTINUITY OF SOLENOIDS IN AN ELECTRONIC AUTOMATIC TRANSMISSION SYSTEM |
| 188,604 | 4,905,545 | METHOD OF CONTROLLING THE SPEED CHANGE OF A KICKDOWN SHIFT FOR AN ELECTRONIC AUTOMATIC TRANSMISSION SYSTEM |
| 188,591 | | METHOD OF CONTROLLING THE APPLY ELEMENT DURING A KICKDOWN SHIFT FOR ELECTRONIC AUTOMATIC TRANSMISSION SYSTEM |
| 188,608 | | METHOD OF CALCULATING TORQUE FOR AN ELECTRONIC AUTOMATIC TRANSMISSION SYSTEM |
| 187,750 | | METHOD OF LEARNING FOR ADAPTIVELY CONTROLLING AN ELECTRONIC AUTOMATIC TRANSMISSION SYSTEM |
| 188,595 | | METHOD OF ACCUMULATOR CONTROL FOR A FRICTION ELEMENT IN AN ELECTRONIC AUTOMATIC TRANSMISSION SYSTEM |
| 188,599 | | METHOD OF ADAPTIVELY SCHEDULING A SHIFT FOR AN ELECTRONIC AUTOMATIC TRANSMISSION SYSTEM |
| 188,601 | | METHOD OF SHIFT CONTROL DURING A COASTDOWN SHIFT FOR AN ELECTRONIC AUTOMATIC TRANSMISSION SYSTEM |
| 188,620 | | METHOD OF TORQUE PHASE SHIFT CONTROL FOR AN ELECTRONIC AUTOMATIC TRANSMISSION |
| 188,596 | | METHOD OF DIAGNOSTIC PROTECTION FOR AN ELECTRONIC AUTOMATIC TRANSMISSION SYSTEM |
| 188,597 | | METHOD OF STALL TORQUE MANAGEMENT FOR AN ELECTRONIC AUTOMATIC TRANSMISSION SYSTEM |
| 188,606 | | METHOD OF SHIFT TORQUE MANAGEMENT FOR AN ELECTRONIC AUTOMATIC TRANSMISSION SYSTEM |
| 188,616 | | ELECTRONIC CONTROLLER FOR AN AUTOMATIC TRANSMISSION |
| 188,600 | | DUAL REGULATOR FOR REDUCING SYSTEM CURRENT DURING AT LEAST ONE MODE OF OPERATION |
| 188,619 | | UTILIZATION OF A RESET OUTPUT OF A REGULATOR AS A SYSTEM LOW-VOLTAGE INHIBIT |
| 188,593 | | THE USE OF DIODES IN AN INPUT CIRCUIT TO TAKE ADVANTAGE OF AN ACTIVE PULL-DOWN NETWORK PROVIDED IN A DUAL REGULATOR |
| 188,609 | | SHUTDOWN RELAY DRIVER CIRCUIT |
| 188,614 | | CIRCUIT FOR DETERMINING THE CRANK POSITION OF AN IGNITION SWITCH BY SENSING THE VOLTAGE ACROSS THE STARTER RELAY CONTROL AND HOLDING AN ELECTRONIC DEVICE IN A RESET CONDITION IN RESPONSE THERETO |
| 188,612 | 4,901,561 | THROTTLE POSITION SENSOR DATA SHARED BETWEEN CONTROLLER WITH DISSIMILAR GROUNDS |
| 188,611 | | NEUTRAL START SWITCH TO SENSE SHIFT LEVER POSITION |
| 188,981 | | OPEN LOOP CONTROL OF SOLENOID COIL DRIVER |

Commonly assigned application Ser. No. 07/187,772, filed Apr. 29, 1988 now U.S. Pat. No. 4,875,391 has been printed in its entirety. The Figures and the entire Specification of that application are specifically incorporated by reference. For a description of the above copending applications, reference is made to the above mentioned U.S. Pat. No. 4,875,391.

SUMMARY OF THE INVENTION

To achieve the foregoing objects, the present invention provides a comprehensive four-speed automatic transmission system. While this transmission system particularly features a fully adaptive electronic control system, numerous other important advances are incorporated into this unique transmission system, as will be described below in detail.

The transmission control system includes a microcomputer-based controller which receives input signals indicative of engine speed, turbine speed, output speed (vehicle speed), throttle angle position, brake application, predetermined hydraulic pressure, the driver selected operating or gear condition (PRNODDL), engine coolant temperature, and/or ambient temperature. This controller generates command or control signals for causing the actuation of a plurality of solenoid-actuated valves which regulate the application and release of pressure to and from the frictional units of the transmission system. Accordingly, the controller will execute predetermined shift schedules stored in the memory of the controller through appropriate command signals to the solenoid-actuated valves and the feedback which is provided by various input signals.

Another primary feature of the present invention is to provide an adaptive system based on closed-loop control. In other words, the adaptive control system performs its functions based on real-time feedback sensor information, i.e., the system takes an action which affects the output, reads the effect, and adjusts the action continuously in real-time. This is particularly advantageous because the control actuations can be corrected as opposed to an open loop control in which signals to various elements are processed in accordance with a predetermined program.

In accordance with one aspect of the present invention, the controller is programmed to determine throttle angle position of the throttle in the engine and to detect any failures of the hardware used to determine throttle angle position. Upon detecting a failure, the present invention provides a default throttle angle value to guarantee satisfactory operation.

BRIEF DESCRIPTION OF THE DRAWINGS

Other objects, features and advantages of the present invention will become more fully apparent from the following detailed description of the preferred embodiment, the appended claims and in the accompanying drawings in which:

FIGS. 23A–C illustrate the throttle angle computation methodology according to the present invention; FIGS. 23A and 23B are flow charts of the throttle angle computation methodology; and FIG. 23C is a plot of variables used for the throttle angle computation methodology.

THROTTLE ANGLE COMPUTATION AND FAILURE DETECTION

The purpose of the throttle angle computation and failure detection method is to compute the throttle angle and to detect any failures of the throttle pot and associated circuitry as described in U.S. Pat. No. 4,637,361, issued Jan. 20, 1987, in the name of Killen, et. al., which is hereby incorporated by reference. The throttle angle value is used in circle 814 and 854 of FIG. 12 for the shift schedule method (FIG. 14). This parameter must be checked and upon detecting a failure, a default throttle value is used to ensure satisfactory operation.

Figure 23A:
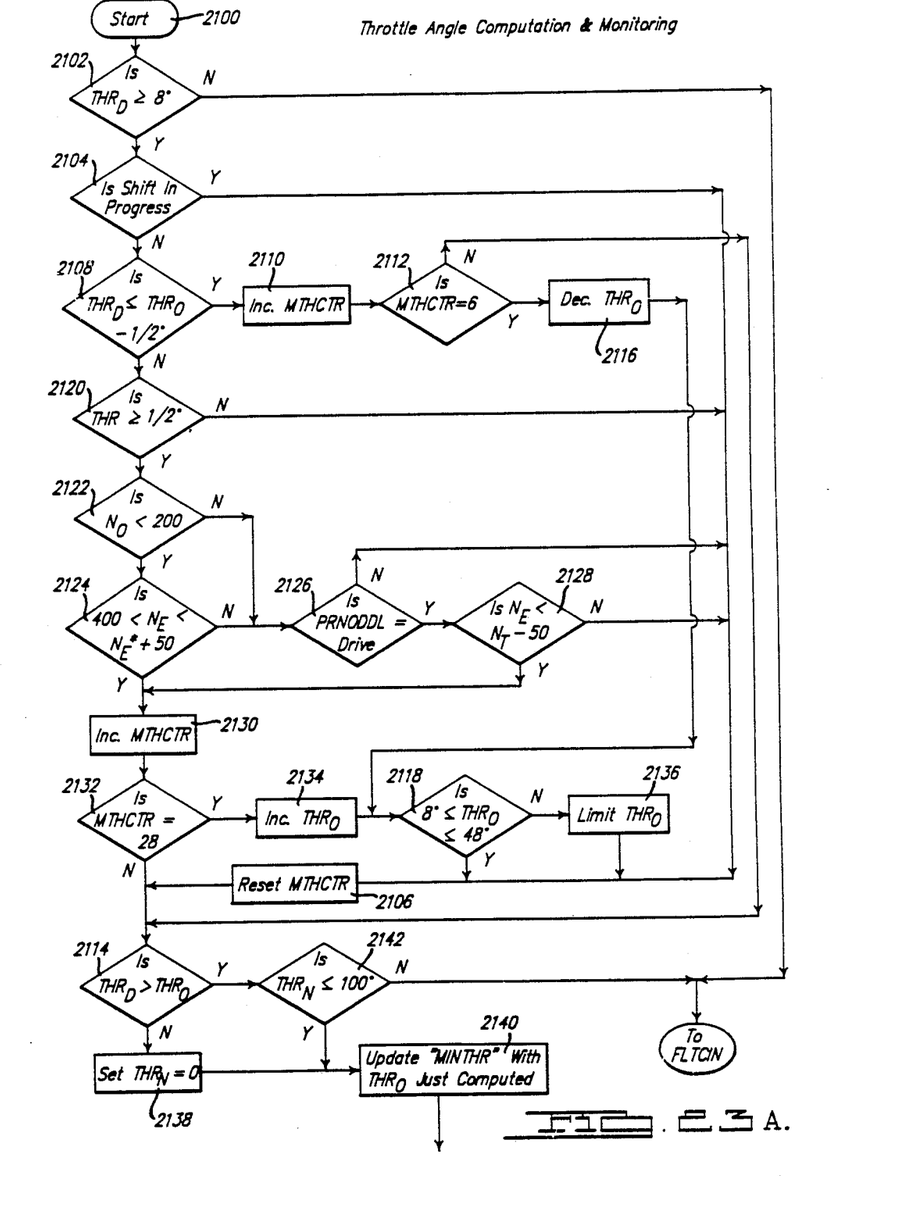
Figure 23B:
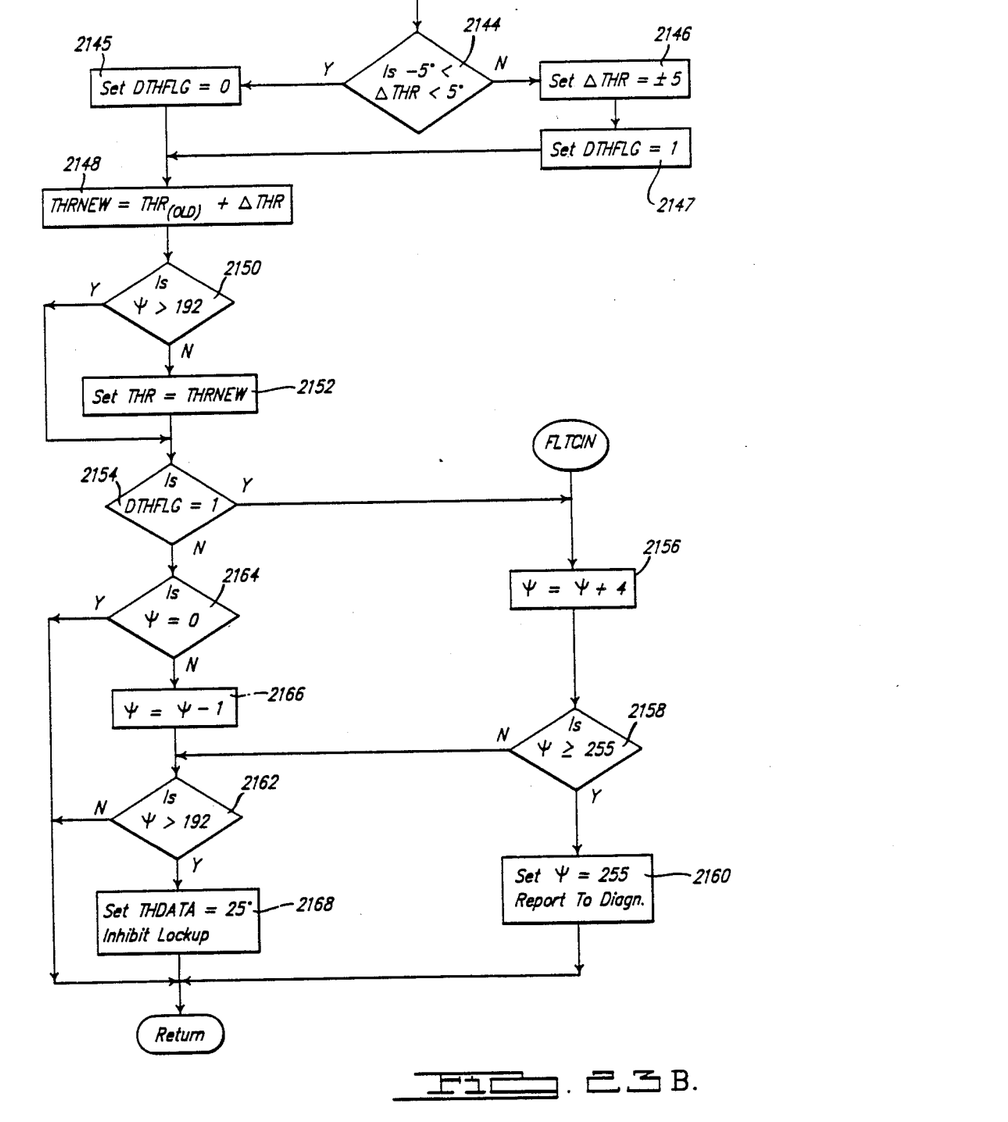

Referring to FIGS. 23A and 23B, the methodology for the throttle angle computation is shown. The methodology starts in bubble 2100 and then advances to diamond 2102. At diamond 2102, the transmission controller 3010 determines whether the raw throttle angle data ($THR_D$) from the throttle pot is greater than or equal to a predetermined value such as eight degrees (See FIG. 23C). If that criteria is not true, the methodology advances to block 2156 to be described. If that criteria is true, the methodology advances to diamond 2104 and determines whether a shift is in progress by looking for a flag which is set when the shift begins. If a shift is in progress, the methodology advances to block 2106 to be described herein.

Figure 23C:
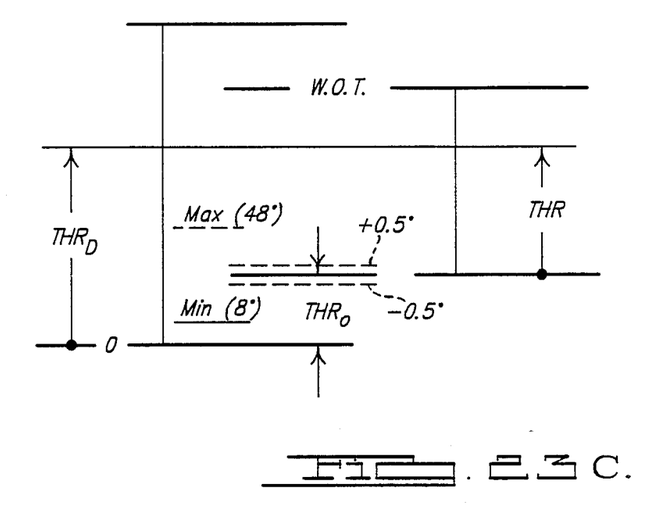

If the shift is not in progress, the methodology advances to diamond 2108 to determine whether the raw throttle angle data ($THR_D$) is less than or equal to the closed minimum throttle value ($THR_o$) of the throttle data minus a predetermined value such as $\frac{1}{2}$ (0.5) degrees (See FIG. 23C). If that criteria is true, the methodology advances to block 2110 and increments a minimum throttle counter such as a timer in the methodology. The methodology then advances to diamond 2112 to determine whether the minimum throttle counter is equal to a predetermined value such as six counts. If that criteria is not true, the methodology advances to diamond 2114 to be described herein. If that criteria is true, the methodology advances to block 2116 and decrements the closed minimum throttle value ($THR_o$) of the raw throttle angle data ($THR_D$). The methodology advances to diamond 2118 to be described herein.

At diamond 2108, if the raw throttle angle data is greater than the closed minimum throttle value minus a predetermined value such as $\frac{1}{2}$ (0.5) degrees, the methodology advances to diamond 2120. At diamond 2120, the transmission controller 3010 determines whether the throttle angle at update (THR) is greater than or equal to a predetermined value such as $\frac{1}{2}$ degree (See FIG. 23C). If that criteria is not true, the methodology advances to block 2106 to reset the minimum throttle counter. If that criteria is true, the methodology advances to diamond 2122 and determines whether output speed $N_o$ is less than a predetermined value such as 200 r.p.m. If the output speed $N_o$ is less than the predetermined value, the methodology advances to diamond 2124 and determines whether engine speed $N_e$ is greater than a predetermined value such as 400 r.p.m. but less than a maximum predetermined value such as $N_e$ (maximum engine speed) plus a value such as 50 r.p.m. If that criteria is true, the methodology advances to block 2130 to be described. If $N_o$ is not less than 200 r.p.m. or $N_e$ is not greater than 400 r.p.m., or $N_e$ is not less than $N_e$ plus 50 r.p.m., the methodology advances to diamond 2126 and determines whether the PRNODDL code from the contact switch sensors $NS_1$ and $NS_2$ equals drive. If the PRNODDL code does not equal drive, the methodology advances to block 2106 previously described. If the PRNODDL code does equal drive, the methodology advances to diamond 2128 and determines whether engine speed $N_e$ is less than turbine speed $N_t$ minus a predetermined value such as 50 r.p.m. If that criteria is not true, the methodology advances to block 2106 previously described. If that criteria is true, the methodology advances to block 2130 and increments the minimum throttle counter. The methodology advances to diamond 2132 and determines whether the minimum throttle counter equals a predetermined value such as 28. If that criteria is not true, the methodology advances to diamond 2114 to be described herein. If that criteria is true, the methodology advances to block 2134 and increments the closed minimum throttle value of raw throttle angle data and advances to diamond 2118.

At diamond 2118, the transmission controller 3010 determines whether the closed minimum throttle value is greater than or equal to a minimum predetermined value such as eight degrees, but less than or equal to a maximum predetermined value such as forty-eight degrees. If that criteria is true, the methodology advances to block 2106 previously described. If that criteria is not true, the methodology advances to block 2136 and limits the closed minimum throttle value. The methodology then advances to block 2106 previously described to reset the minimum throttle counter. The methodology then advances to diamond 2114.

At diamond 2114, the transmission controller 3010 determines whether the raw throttle angle data is greater than the closed minimum throttle value. If that criteria is not true, the methodology advances to block 2138 and sets a new unlimited throttle angle equal to a predetermined value such as zero. The methodology then advances to block 2140 to be described herein.

At diamond 2114, if the throttle data is greater than the closed minimum throttle value, the methodology advances to diamond 2142 and determines whether the new unlimited throttle angle is less than or equal to a predetermined value such as 100 degrees. If that criteria is not true, the methodology advances to block 2156. If that criteria is true, the methodology advances to block 2140 and updates the minimum throttle angle memory location with THR$_o$ just computed. The methodology then advances to diamond 2144 (See FIG. 23B) and determines whether the change in the new unlimited throttle angle ($\Delta$THR) is between a predetermined range such as −5 to 5 degrees. If that criteria is not true, the methodology advances to block 2146 and sets the change in throttle angle within a predetermined limit such as ±/−5 degrees. The methodology then advances to block 2147 and sets the delta ($\Delta$) throttle exceeded limit flag (DTHFLG) equal to one. The methodology then advances to block 2148 to be described herein.

At diamond 2144, if the change in the new unlimited throttle angle is between the predetermined range, the methodology advances to block 2145 and clears the delta throttle exceeded limit flag (set equal to zero). From block 2145, the methodology advances to block 2148 and calculates a new throttle angle based on the old throttle angle at update plus the change in throttle angle. The methodology advances to diamond 2150 and determines whether the throttle error counter ($\psi$) is greater than a predetermined value such as 192 counts. If this criteria is true, the methodology advances to block 2154 to be described. If that criteria is not true, the methodology advances to block 2152 and sets the throttle angle at update equal to the new throttle angle because normal operation of the hardware is occurring. The methodology advances to diamond 2154 and determines whether the delta ($\Delta$) throttle exceeded limit flag has previously been set. If that criteria is true, the methodology then advances to block 2156 and increments the throttle error counter. The methodology advances to diamond 2158 and determines whether the throttle error counter is greater than or equal to a predetermined value such as 255. If that criteria is true, the methodology advances to block 2160 and sets the throttle error counter to this predetermined value and reports a failure to the diagnostics providing that engine speed N$_e$ is greater than a predetermined value such as 500 r.p.m. and the raw throttle angle data (THR$_D$) is less than a predetermined value such as 6° or greater than a predetermined value such as 120.5°. The methodology then returns. If the throttle error counter is less than the predetermined value, the methodology advances to diamond 2162.

At diamond 2154, if the delta throttle exceeded limit flag has not previously been set, the methodology advances to diamond 2164 to determine whether the throttle error counter is equal to a predetermined value such as zero. If the throttle error counter equals zero, the methodology returns. If the throttle error counter does not equal zero, (i.e. an error has occurred), the methodology advances to block 2166 and decrements the throttle error counter. The methodology advances to diamond 2162 to determine whether the throttle error counter is greater than a predetermined value such as 192. If that criteria is not true, the methodology returns. If that criteria is true, the methodology advances to block 2168 and sets the throttle angle data equal to a predetermined value such as 25 degrees (default value) and inhibits lock-up operation of the torque converter, previously described, by setting a flag for example. From block 2168, the methodology returns.

The present invention has been described in an illustrative manner. It is to be understood that the terminology which has been used is intended to be in the nature of words of description rather than of limitation.

Obviously, many modifications and variations are possible in light of the above teachings. Therefore, the subject invention may be practiced otherwise than as specifically described.

What is claimed is:

1. In a vehicle having an engine with a throttle means to regulate the flow of combustible elements into the engine and a throttle position indicator with a variable electrical output in communication with the throttle means such that movement of the throttle means translates to a change in the variable electrical output of the indicator, a transmission system including an input member, torque converter assembly for transmitting torque between the engine and the input member, an output member, a gear assembly for changing the ratio of torque between the input member and output member, a plurality of input sensors for providing a signal of the speed of the engine, output member, input member, and a controller for processing the signals and providing output signals, a method of determining the angular position of a throttle on an engine for use in controlling a vehicle transmission, said method comprising the steps of:

sensing an actual throttle position as a function of the electrical output of the indicator;

determining whether the actual throttle position value is at least equal to a first predetermined position value stored in memory;

incrementing a throttle position error counter if the actual throttle position value is not less than the first predetermined position value;

determining whether the actual throttle position value is less than a predetermined closed minimum throttle position value stored in memory if the actual throttle position value is at least equal to the first predetermined position value;

determining whether the count value on the throttle position error counter is greater than a first predetermined error value; and defining a predetermined default value if the count value on the throttle position error counter is greater than the first predetermined error value.

2. A method as set forth in claim 1 including the steps of:
   determining whether the count value on the throttle position error counter is at least equal to a second predetermined error value; and
   if the count value on the throttle position error counter is at least equal to the second predetermined error value, setting the count value on the throttle position equal to the second predetermined error value;
   checking whether the speed of the engine is greater than a predetermined speed;
   checking whether the actual throttle position value is outside a predetermined window; and
   reporting that an unacceptable condition has occurred.

3. In a vehicle having an engine with a throttle means to regulate the flow of combustible elements into the engine and a throttle position indicator with a variable electrical output in communication with the throttle means such that movement of the throttle means translates to a change in the variable electrical output of the indicator, a transmission system including an input member, torque converter assembly for transmitting torque between the engine and the input member, an output member, a gear assembly for changing the ratio of torque between the input member and output member, a plurality of input sensors for providing a signal of the speed of the engine, output member, input member, and a controller for processing the signals and providing output signals, a method of determining the angular position of a throttle on an engine for use in controlling a vehicle transmission, said method comprising the steps of:
   sensing an actual throttle position as a function of the electrical output of the indicator;
   determining whether the actual throttle position value is at least equal to a first predetermined position value stored in memory;
   if the actual throttle position value is not less than the first predetermined position value, incrementing a throttle position error counter;
   if the actual throttle position value is at least equal to the first predetermined position value, determining whether the actual throttle position value is less than a predetermined closed minimum throttle position valve stored in memory;
   determining whether the count value on the throttle position error counter is greater than the first predetermined error value;
   if the count value on the throttle position error counter is greater than the first predetermined error value, defining a predetermined default value;
   determining whether the count value on the throttle position error counter is at least equal to a second predetermined error value;
   if the count value on the throttle position error counter is at least equal to the second predetermined error value, setting the count value on the throttle position equal to the second predetermined error value;
   checking whether the speed of the engine is greater than a predetermined speed;
   checking whether the actual throttle position value is outside a predetermined window; and
   reporting that an unacceptable condition has occurred.

4. In a vehicle having an engine with a throttle means to regulate the flow of combustible elements into the engine and a throttle position indicator with a variable electrical output in communication with the throttle means such that movement of the throttle means translates to a change in the variable electrical output of the indicator, a transmission system including an input member, torque converter assembly for transmitting torque between the engine and the input member, an output member, a gear assembly for changing the ratio of torque between the input member and output member, a plurality of input sensors for providing a signal of the speed of the engine, output member, input member, and a controller for processing the signals and providing output signals, a method of determining the angular position of a throttle on an engine for use in controlling a vehicle transmission, said method comprising the steps of:
   sensing the actual throttle position as a function of the electrical output of the indicator;
   determining whether the actual throttle position value is greater than a closed minimum throttle position value;
   if the actual throttle position value is not greater than the closed minimum throttle position value, setting a new unlimited throttle position value equal to a first predetermined throttle position value;
   if the actual throttle position value is greater than the closed minimum throttle position value, determining whether the new unlimited throttle position value is at least equal to a second predetermined throttle position value;
   if the new unlimited throttle position value is at least equal to the second predetermined value, updating a minimum throttle position memory location;
   if the new unlimited throttle position value is not at least equal to the second predetermined value, incrementing a throttle position error counter;
   determining whether the count value on the throttle position error counter is greater than a first predetermined error value; and
   if the count value on the throttle position error counter is greater than the first predetermined error value, defining a predetermined default value as the throttle position value.

5. A method as set forth in claim 1 including the steps of:
   determining whether the count value on the throttle position error counter is at least equal to a second predetermined error value; and
   if the count value on the throttle position error counter is at least equal to the second predetermined error value, setting the count value on the throttle position equal to the second predetermined error value;
   checking whether the speed of the engine is greater than a predetermined speed;
   checking whether the actual throttle position value is outside a predetermined window; and
   reporting that an unacceptable condition has occurred.

6. A method as set forth in claim 5 including the steps of:
   determining whether a shift between two gears of the gear assembly is in progress by comparing signals from the input sensors of the speed of the input and output members to each other;

if a shift is in progress, resetting a minimum throttle counter;

if a shift is not in progress, determining whether the actual throttle position value is at least equal to a predetermined closed minimum throttle position value stored in memory;

if the actual throttle position value is at least equal to the predetermined closed minimum throttle position value, incrementing the minimum throttle counter;

if the actual throttle position value is not at least equal to the predetermined closed minimum throttle position value, determining whether an updated throttle position value is at least equal to a third predetermined position value stored in memory;

if the updated throttle angle is not at least equal to the third predetermined position value, resetting the minimum throttle counter;

if the updated throttle angle is at least equal to the third predetermined position value, determining whether the speed of the output member of the transmission is less than a predetermined speed stored in memory by comparing the speeds to each other;

if the output speed of the transmission is not less than the predetermined speed, determining whether the driver-selected operating mode of the transmission is drive by the signal from the sensors;

if the output speed of the transmission is less than the predetermined speed, determining whether the speed of the engine is between a predetermined minimum and maximum speeds stored in memory by comparing the speeds to each other;

if the driver-selected operating mode of the transmission is drive, determining whether the engine speed is less than the difference between the speed of the input member in the transmission and a predetermined speed by comparing the speeds to each other;

if the engine speed is between the predetermined minimum and maximum speed, incrementing the minimum throttle counter;

if the engine speed is not less than the predetermined speed, resetting the minimum throttle counter;

if the speed of the engine is less than the predetermined speed, incrementing the minimum throttle counter; and if the driver-selected operating mode is not drive, resetting the minimum throttle counter.

7. A method as set forth in claim 6 including the steps of:

determining whether the count value on the minimum throttle counter is equal to a first predetermined count value; and if the count value on the minimum throttle counter is equal to the first predetermined count value, decrementing the closed minimum throttle position value.

8. A method as set forth in claim 7 including the steps of:

determining whether the count value on the minimum throttle counter is equal to a second predetermined count value;

if the count value on the minimum throttle counter is equal to the second predetermined count value, incrementing the closed minimum throttle position value;

determining whether the closed minimum throttle position value is between a predetermined minimum and maximum throttle position value;

if the closed minimum throttle position value is not within the predetermined minimum and maximum throttle position value, limiting the closed minimum throttle position value; and if the closed minimum throttle position value is within the predetermined minimum and maximum throttle position value, resetting the minimum throttle counter.

9. In a vehicle having an engine with a throttle means to regulate the flow of combustible elements into the engine and a throttle position indicator with a variable electrical output in communication with the throttle means such that movement of the throttle means translates to a change in the variable electrical output of the indicator, a transmission system including an input member, torque converter assembly for transmitting torque between the engine and the input member, an output member, a gear assembly for changing the ratio of torque between the input member and output member, a plurality of input sensors for providing a signal of the speed of the engine, output member, input member, and a controller for processing the signals and providing output signals, a method of determining the angular position of a throttle on an engine for use in controlling a vehicle transmission, said method comprising the steps of:

sensing an actual throttle position as a function of the electrical output of the indicator;

determining whether the actual throttle position value is greater than a closed minimum throttle position value;

setting a new unlimited throttle position value equal to a first predetermined throttle position value if the actual throttle position value is not greater than the closed minimum throttle position value;

determining whether the new unlimited throttle position value is at least equal to a second predetermined throttle position value if the actual throttle position value is greater than the closed minimum throttle position value;

updating a minimum throttle position memory location if the new unlimited throttle position value is at least equal to the second predetermined value;

incrementing a throttle position error counter if the new unlimited throttle position value is not at least equal to the second predetermined value;

determining whether the count value on the throttle position error counter is greater than a first predetermined error value;

defining a predetermined defalult value as the throttle position value if the count value on the throttle position error counter is greater than the first predetermined error value;

determining whether the count value on the throttle position error counter is at least equal to a second predetermined error value; and setting the count value on the throttle position equal to the second predetermined error value if the count value on the throttle position error counter is at least equal to the second predetermined error value;

checking whether the speed of the engine is greater than a predetermined speed;

checking whether the actual throttle position value is outside a predetermined window;

reporting that an unacceptable condition has occurred;

determining whether a shift between two gears of the gear assembly is in progress by comparing signals from the input sensors of the speed of the input and output members to each other;

resetting a minimum throttle counter if a shift is in progress;

determining whether the actual throttle position value is at least equal to a predetermined closed minimum throttle position value stored in memory if a shift is not in progress;

incrementing the minimum throttle counter if the actual throttle position value is at least equal to the predetermined closed minimum throttle position value;

determining whether an updated throttle position value is at least equal to a third predetermined position value stored in memory if the actual throttle position value is not at least equal to the predetermined closed minimum throttle position value;

resetting the minimum throttle counter if the updated throttle angle is not at least equal to the third predetermined position value;

determining whether the speed of the output member of the transmission is less than a predetermined speed stored in memory by comparing the speeds to each other if the updated throttle angle is at least equal to the third predetermined position value;

determining whether the driver-selected operating mode of the transmission is drive by the signal from the sensors if the output speed of the transmission is not less than the predetermined speed;

determining whether the speed of the engine is between a predetermined minimum and maximum speeds stored in memory by comparing the speeds to each other if the output speed of the transmission is less than the predetermined speed;

determining whether the engine speed is less than the difference between the speed of the input member in the transmission and a predetermined speed by comparing the speeds to each other if the driver-selected operating mode of the transmission is drive;

incrementing the minimum throttle counter if the engine speed is between the predetermined minimum and maximum speed;

resetting the minimum throttle counter if the engine speed is not less than the predetermined speed;

incrementing the minimum throttle counter if the speed of the engine is less than the predetermined speed;

resetting the minimum throttle counter if the driver-selected operating mode is not drive;

determining whether the count value on the minimum throttle counter is equal to a first predetermined count value;

decrementing the closed minimum throttle position value if the count value on the minimum throttle counter is equal to the first predetermined count value;

determining whether the count value on the minimum throttle counter is equal to a second predetermined count value;

incrementing the closed minimum throttle position value if the count value on the minimum throttle counter is equal to the second predetermined count value;

determining whether the closed minimum throttle position value is between a predetermined minimum and maximum throttle position value;

limiting the closed minimum throttle position value if the closed minimum throttle position value is not within the predetermined minimum and maximum throttle position value; and resetting the minimum throttle counter if the closed minimum throttle position value is within the predetermined minimum and maximum throttle position value.

* * * * *